E. L. MORRIS.
Toy Savings-Bank.
No. 223,293.          Patented Jan. 6, 1880.
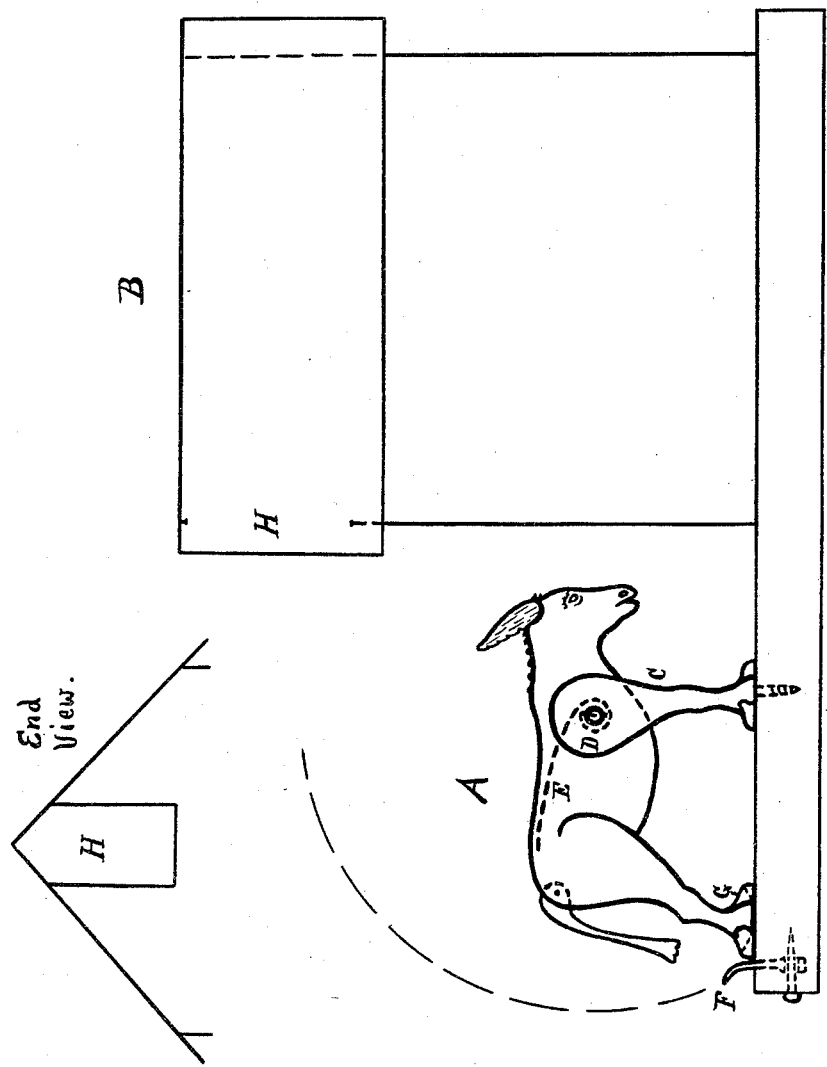
Witnessess:          Inventor:
Myron N. Morris.     Edward L. Morris.
F. G. Butler.

UNITED STATES PATENT OFFICE.

EDWARD L. MORRIS, OF BOSTON, MASSACHUSETTS.

TOY SAVINGS-BANK.

SPECIFICATION forming part of Letters Patent No. 223,293, dated January 6, 1880.

Application filed November 6, 1879.

*To all whom it may concern:*

Be it known that I, EDWARD L. MORRIS, of Boston, in the county of Suffolk and State of Massachusetts, have invented a new and useful Improvement in Toy Savings-Banks, of which the following is a specification.

My invention relates to an improved toy savings-bank; and it consists of a receptacle for coin, into which the coin is thrown by a kicking animal, the said animal being operated by means of a suitable weight or spring.

In the accompanying plate of drawing my improved toy is illustrated.

A represents any animal, preferably a donkey or mule, and B represents a receptacle for coin, preferably in the form of a barn.

The front legs, C, of the animal are fastened to the floor or ground, and are pivoted to the animal by means of a bolt or rivet, D, which passes through the body of the animal loosely, and is fastened securely to the legs at the shoulder.

A spring, E, is secured to the bolt or rivet D, and pressed backward into the body of the animal, thus being made to exert a pressure which tends to throw the heels of the animal upward. The spring E being thus in place, and the front legs, C, being secured firmly to the floor or ground at a suitable distance from the coin-receptacle B, the heels of the animal are held down by means of a hook or catch, F.

A niche, G, is constructed between the heels of the animal for the purpose of holding coin, which may be placed loosely therein. An opening, H, is provided in the coin-receptacle B, through which the coin is thrown when the heels of the animal are set free.

Now, placing a coin in the niche G, and setting free the hook or catch F, the action of the spring E throws the heels of the animal suddenly upward, and the coin, flying from the niche G in the direction of the coin-receptacle B, enters the opening H and disappears within the said receptacle.

By constructing the animal A with the portion in front of the bolt or rivet D much heavier than the portion back of the said bolt or rivet, the extra weight of the front portion may be caused to elevate the heels of the animal and produce a similar result to the action of the spring E.

By pivoting the hind legs to the body of the animal the antics performed when the heels are set free may be further increased; but the hind legs are preferably made solid with the body for the sake of simplicity in construction.

Having thus described my invention, what I claim, and desire to secure by Letters Patent, is—

The toy bank consisting of the coin-receptacle B, having an opening, H, and a toy animal, A, adapted to hold a coin, and provided with mechanism, substantially as described, whereby the heels of the animal are thrown upward and the coin caused to fall into the receptacle, substantially as described.

EDWARD L. MORRIS.

Witnesses:
L. BUCKLAND,
MERTON S. BUCKLAND.